Figure 1:
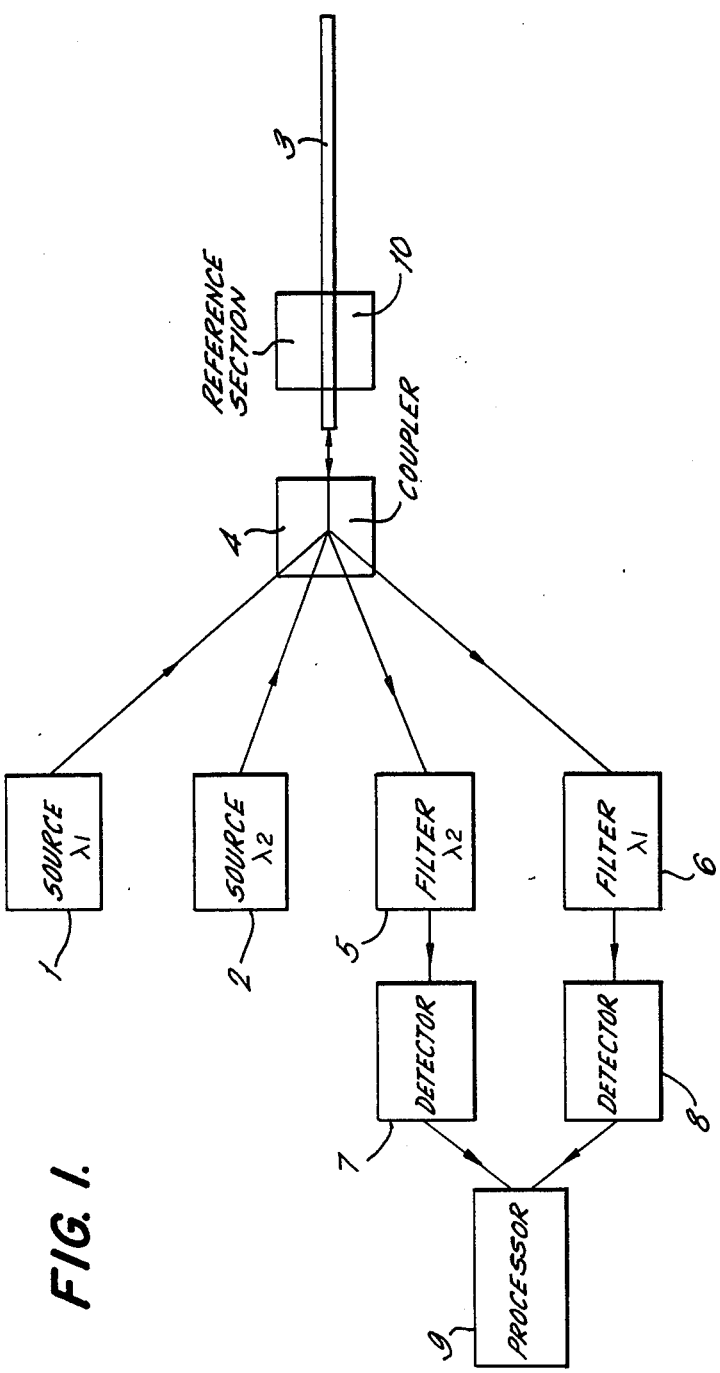

United States Patent [19]

Bibby

[11] Patent Number: 4,859,065
[45] Date of Patent: Aug. 22, 1989

[54] TEMPERATURE MEASUREMENT

[75] Inventor: Geoffrey W. Bibby, Leatherhead, England

[73] Assignee: Central Electricity Generating Board, London, England

[21] Appl. No.: 916,142

[22] Filed: Oct. 7, 1986

[30] Foreign Application Priority Data

Oct. 18, 1985 [GB] United Kingdom ............... 8525724

[51] Int. Cl.$^4$ ............................................. G01J 5/60
[52] U.S. Cl. ........................................ 356/45; 356/44
[58] Field of Search ................ 374/131, 161; 356/44, 356/45

[56] References Cited

U.S. PATENT DOCUMENTS

| | | | |
|---|---|---|---|
| 3,986,775 | 10/1976 | Chang et al. | 356/45 |
| 4,011,013 | 3/1977 | Barrett | 356/301 |
| 4,081,215 | 3/1978 | Penny et al. | 356/45 |
| 4,176,960 | 12/1979 | Eckbreth | 356/338 |
| 4,710,033 | 12/1987 | Hirano et al. | 250/458.1 |

FOREIGN PATENT DOCUMENTS 2140554 11/1984 United Kingdom ............... 374/131

Primary Examiner—Craig E. Church
Attorney, Agent, or Firm—Antonelli, Terry & Wands

[57] ABSTRACT

A method of measuring temperature comprises the steps of consecutively launching (1, 2) input pulses of light at two different wavelengths into a temperature sensing element in the form of an elongate optical fibre (3); passing Raman scattered light from said element and deriving from said input pulses to intensity detectors (7, 8); obtaining from the detectors (7, 8) output signals indicative of the intensity of the Raman scattered light; and processing said output signals to provide a temperature measurement. A known position (10) along the optical fibre (3) is maintained at a known temperature to provide a reference for deriving temperature measurements at other positions along the optical fibre.

10 Claims, 2 Drawing Sheets

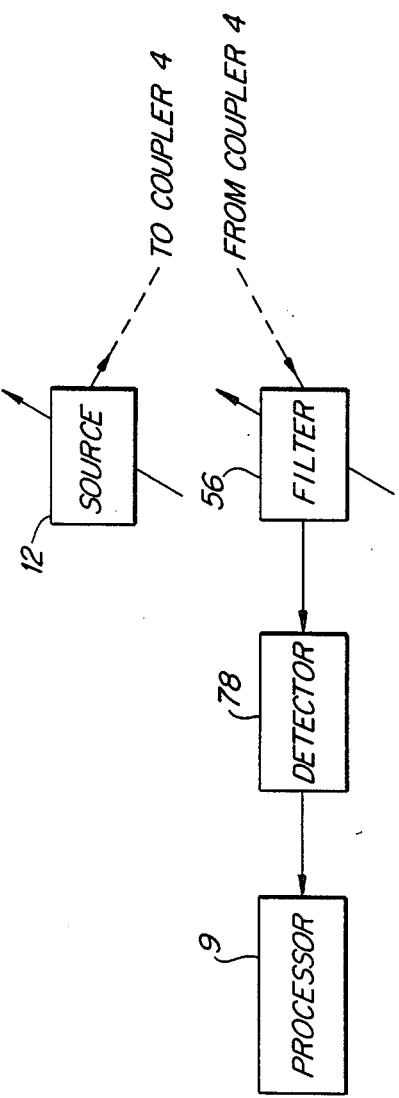

TEMPERATURE MEASUREMENT

This invention relates to a method of measuring temperature and, in particular, to a method of measuring temperature using optical time domain reflectometry (OTDR).

Such a method of temperature measurement involves the launching of short pulses of light into one end of an optical fibre temperature sensing element and then detecting the intensity of the backscattered light at a position at or close to the launch end of the optical fibre. The spectrum of the backscattered light will include a major component at or near the wavelength of the input pulses due to Rayleigh, Mie and Brillouin scattering, and will also include weaker components at significantly longer and shorter wavelengths due to Stokes and anti-Stokes Raman scattering, respectively.

The time of receipt of backscattered light at the detection position relative to the time of input pulse launch is dependent upon the distances from the pulse input position that scattering occurred, and thus the temperature at different positions along the optical fibre sensing element can be measured by taking into account such time delay.

In British Patent Application No. 2,140,554, published on Nov. 28, 1984, there is disclosed such an OTDR temperature measuring method in which the Rayleigh and Mie and Brillouin wavelengths are filtered out of the backscattered light, while the Stokes and anti-Stokes Raman wavelengths are fed to detecting and processing apparatus which calculates therefrom the temperature at the position from which the light was backscattered. This known method uses input pulses of a single wavelength, with temperature measurement being carried out by calculation of the ratio of backscattered light intensity at the Stokes and anti-Stokes Raman wavelength.

As disclosed in British Patent Application No. 2,140,554, a laser, for example a semiconductor laser, is used as an input pulse source, while a dichromator is used to effect the necessary filtering of the backscattered light, the dichromator passing the Stokes and anti-Stokes Raman wavelengths to two separate detectors, respectively.

This known method and apparatus have disadvantages.

Firstly, the efficiency of the dichromator, or other device, used to effect the necessary filtering of the backscattered light, and the responsivity of the detectors used to determine the intensity may be different for the Stokes and anti-Stokes Raman wavelengths.

Secondly, the disclosed method and apparatus do not take into account the likely difference in the attenuation of the backscattered light at the Stokes and anti-Stokes Raman wavelengths, which attenuation difference will progressively alter the intensity ratio at those wavelengths as the backscattered light returns along the optical fibre. The alteration in the ratio is equivalent to an error in temperature measurement and will increase with increase in distance between the input end of the optical fibre and the position of scattering and temperature measurement.

According to the present invention there is provided a method of measuring temperature, comprising the steps of consecutively launching input pulses of light at two different wavelengths, $\lambda_1$ and $\lambda_2$, into a temperature sensing element; passing Raman scattering light from said element and derived from said input pulses, at wavelengths $\lambda_2$ and $\lambda_1$ respectively, to an intensity detector or detectors; obtaining from said detector or detectors output signals indicative of the intensity of the Raman scattered light at the wavelengths $\lambda_2$ and $\lambda_1$ deriving from said input light pulses at wavelengths $\lambda_1$ and $\lambda_2$ respectively; and processing said output signals to provide a temperature measurement, the wavelengths $\lambda_1$ and $\lambda_2$ being chosen such that:

$$1/\lambda_1 - 1/\lambda_2 = \nu$$

where $\nu$ (1) is the Stokes shift in wavenumber units of the Raman scattered light at wavelength $\lambda_2$ arising from input light at wavelength $\lambda_1$.

This invention will now be described by way of an example with reference to the drawing which:

FIG. 1 is a block diagram of one embodiment of apparatus for use in carrying out the method of the invention; and FIG. 2 is a fragmentary block diagram illustrating a second embodiment of apparatus for use in carrying out the method of the invention.

The apparatus comprises two sources 1 and 2 of monochromatic light at wavelengths $\lambda_1$ and $\lambda_2$ respectively. Otherwise a single source tunable to the two wavelengths can be used. Pulses of light from the sources 1 and 2 are launched into one end of an elongate optical fibre 3 which serves as a temperature sensing element, via a fibre optical coupler 4. Backscattered light from the optical fibre 3 returns through the coupler 4, parts of the backscattered light passing via wavelength selective filters 5 and 6 to intensity detectors 7 and 8 respectively. Filter 5 passes light of wavelength $\lambda_2$ to detector 7 but does not pass light of other wavelengths. Filter 6 passes only light of wavelength $\lambda_1$ to detector 8. Otherwise a single detector can be used together with a filter tunable to the two wavelengths. The detectors 7 and 8 give output signals indicative of the intensity of the light passed thereto, which output signals are supplied to a processing means 9 operative to provide a temperature measurement therefrom as will be described hereafter.

The fibre 3 is arranged to extend over a path along which temperature measurements are to be made. A known position 10 along the fibre is maintained at a known temperature to provide the possibility of carrying out a reference calculation for temperature measurements at other positions along the fibre 3, as will be described hereafter.

Light pulses from the sources 1 and 2 are launched consecutively into the fibre 3 and the apparatus used to effect optical time domain reflectometry combined with Raman spectroscopy techniques, in accordance with the following principles.

The wavelengths $\lambda_1$ and $\lambda_2$ are set such that $\nu$ is the Stokes shift in wavenumber units of the Raman scattered light at wavelength $\lambda_2$ arising from an input pulse of wavelength $\lambda_1$ launched into the fibre; $\lambda_2$ is greater than $\lambda_1$ therefore. The wavenumber shift $\nu$ is chosen after taking into consideration the Raman spectrum of the material of the light-guiding part of the optical fibre and the temperature range to be covered, to obtain sufficient anti-Stokes and Stokes Raman scattered intensity.

The detectors 7 and 8 provide consecutively an output signal from detector 7 indicative of the Stokes-shifted Raman backscattered light intensity at wavelength $\lambda_2$ derived from input pulses of wavelength $\lambda_1$ and the output signal from detector 8 indicative of the anti-Stokes-Shifted Raman backscattered light intensity at wavelength $\lambda_1$ derived from input pulses at wavelength $\lambda_2$.

The time dependence of the output signals from detectors 7 and 8 in relation to the input pulses is used in accordance with conventional OTDR techniques to determine the variation with position along the fibre 3 of the Raman backscattering properties of the fibre, from which the temperature variation along the fibre is derived.

The intensity of light Raman scattered in the fibre, either Stokes or anti-Stokes shifted, varies with the temperature of the scattering position in a well-understood manner (see 'Raman Spectroscopy' by D. A. Long, 1977). The ratio of anti-Stokes-shifted to Stokes-shifted scattered light intensity varies exponentially according to the reciprocal of the absolute temperature T at the position of scatter, for scattering at a given Raman shift $\pm\nu$ relative to the input wavelength.

The ratio M(T) of the signals from the detectors arising from Raman scattering in a section of the fibre at absolute temperature T can be expressed as $$M(T) = A/S = (PLFD\ \alpha)\exp(-hc\nu/kT) \qquad (2)$$

where A is the signal from detector 8, S is the signal from detector 7, the factor P depends on the ratio of the energies of the pulses of light at wavelengths $\lambda_2$ and $\lambda_1$, the factor L depends on the ratio of the anti-Stokes-shifted wavelength ($\lambda_1$) to the Stokes-shifted wavelength ($\lambda_2$), the factor F depends on the ratio of the efficiencies of the two filters (and other components in the optical paths between fibre 3 and the detectors) in passing light at the wavelengths $\lambda_1$ and $\lambda_2$ to the respective detector, the factor D depends on the ratio of the responsivity of detector 8 at wavelength $\lambda_1$ to the responsivity of detector 7 at wavelength $\lambda_2$, and the factor $\alpha$ depends on the effects of attenuation in the fibre. The other symbols in the expression (2) are k, Boltzmann's constant; h, Planck's constant; and c, the velocity of light in free space.

Since in the method of this invention the light used for the measurements passes equal distances through the fibre at wavelengths $\lambda_1$ and $\lambda_2$ (outwards at one wavelength and returning to the launch end of the fibre at the other wavelength) for both signals A and S, they are equally affected by the attenuation in the fibre, so that $\alpha=1$ even if the attenuation constant of the fibre differs between the two wavelengths. This is in contrast to the method disclosed in British Patent Application No. 2,140,554, where the light used for the measurements passes outwards at the single source wavelength and returns at two different wavelengths, so that the effect of attenuation is not necessarily equivalent for the anti-Stokes and Stokes components. The factor $\alpha$ then depends on the spectral attenuation properties of the sensor fibre and the distance along the fibre from the measurement position to the launch end, and cannot be determined by the method and apparatus disclosed by British Patent Application No. 2,140,554.

The factors P, L, F and D can all be found by measurement of the appropriate characteristics of the apparatus, for example, as part of an initial calibration of the system. However, this approach has the disadvantages of inconvenience, especially if components later have to be replaced or adjusted, and risk of error if the characteristics of the apparatus alter through ageing of components or other causes.

A convenient and practical method which avoids the need to know these factors is to maintain the section 10 of the fibre 3 at a known absolute temperature $\theta$ and to make backscattered light measurements corresponding to this 'reference' position as well as for those positions where temperature is to be measured. The ratio of the signals for the reference position would be given by (since $\alpha=1$)

$$M(\theta) = (PLFD)\exp(-hc\nu/k\theta) \qquad (4)$$

The factors P, L, F and D can be eliminated by combining (2) and (3) to obtain an expression for T, the temperature at the measurement position, namely $$1/T = 1/\theta - (k/hc\ \nu\ln(M(T)/M(\theta)) \qquad (4)$$

The unknown temperature can thus be found from $\theta$, $\nu$, fundamental physical constants and the measured Raman signal ratios at the 'reference' and 'measurement' positions in the fibre.

I claim:

1. A method of measuring temperature sensed by a temperature sensing element comprising the steps of:
   consecutively launching into said temperature sensing element input pulses of light at two different wavelengths, $\lambda_1$ and $\lambda_2$, to obtain from said temperature sensing element Raman scattered light driving from the input pulses, at wavelengths $\lambda_2$ and $\lambda_1$ respectively;
   applying the Raman scattered light to an intensity detector or detectors;
   obtaining from said detector or detectors output signals indicative of the intensity of the Raman scattered light at the wavelengths $\lambda_2$ and $\lambda_1$ deriving from the input pulses at wavelengths $\lambda_1$ and $\lambda_2$ respectively; and
   processing the output signals to provide a temperature measurement;
   the wavelengths $\lambda_1$ and $\lambda_2$ being chosen such that $$1/\lambda_1 - 1/\lambda_2 = \nu$$

where $\nu$ is the Stokes shift in wavenumber units of the Raman scattered light at wavelength $\lambda_2$ arising from input light at wavelength $\lambda_1$.

2. A method as claimed in claim 1, in which said temperature sensing element comprises an elongate optical fibre into one end of which the input pulses are launched.

3. A method as claimed in claim 2, further comprising maintaining a known position along the optical fibre from said one end at a known temperature to provide a reference for deriving temperature measurements at other positions along the optical fibre.

4. Apparatus for measuring temperature sensed by a temperature sensing element, said apparatus comprising:
   a temperature sensing element;
   means for consecutively launching into said temperature sensing element input pulses of light at two different wavelengths, $\lambda_1$ and $\lambda_2$ to obtain from said temperature sensing element Raman scattered light deriving from the input pulse, at wavelengths $\lambda_2$ and $\lambda_1$, respectively;

means for passing the Raman scattered light from said element only at wavelength $\lambda_2$ derived from input pulses at wavelength $\lambda_1$ and at wavelength $\lambda_1$ derived from input pulses at wavelength $\lambda_2$;

intensity detector means for receiving from said scattered light passing means scattered light at wavelengths $\lambda_2$ and $\lambda_1$ to provide output signals indicative of the intensity of the Raman scattered light at the wavelengths $\lambda_2$ and $\lambda_1$ deriving from the input pulses at wavelengths $\lambda_1$ and $\lambda_2$, respectively; and processing means for processing the output signals to provide a temperature measurement therefrom;

the wavelengths $\lambda_1$ and $\lambda_2$ being chosen such that $$1/\lambda_1 - 1/\lambda_2 = \nu$$

where $\nu$ is the Stokes shift in wavenumber units of the Raman scattered light at wavelength $\lambda_2$ arising from input light at wavelength $\lambda_1$.

5. Apparatus as claimed in claim 4, in which said temperature sensing element is an elongate optical fibre.

6. Apparatus as claimed in claim 4, in which said launching means comprises two separate sources of light at wavelengths $\lambda 1$ and $\lambda 2$ resepctively.

7. Apparatus as claimed in claim 4, in which said launching means comprises a single source of monochromatic light tunable to wavelenghts $\lambda_1$ and $\lambda_2$.

8. Apparatus as claimed in claim 4, in which said scattered light passing means includes a tubable filter.

9. Apparatus as claimed in claim 4, in which said scattered light passing means includes two separate filters for passing light of said two wavelengths respectively.

10. Apparatus as claimed in claim 5, further comprising means for maintaining a known position along the optical fibre from one end thereof at a known temperature to provide a reference for deriving temperature measurements at other positions along the optical fibre.

* * * * *

UNITED STATES PATENT AND TRADEMARK OFFICE
CERTIFICATE OF CORRECTION

PATENT NO. : 4,859,065

DATED : August 22, 1989

INVENTOR(S) : Geoffrey Walton BIBBY

It is certified that error appears in the above-identified patent and that said Letters Patent is hereby corrected as shown below:

Renumber the equation at column 4, line 12, as Equation (3).

Signed and Sealed this

Fifth Day of May, 1992

*Attest:*

DOUGLAS B. COMER

*Attesting Officer*     *Acting Commissioner of Patents and Trademarks*